A. FRETZ.
SPEED CHANGE GEARING.
APPLICATION FILED JAN. 9, 1918.
1,286,987.
Patented Dec. 10, 1918.
3 SHEETS—SHEET 1.
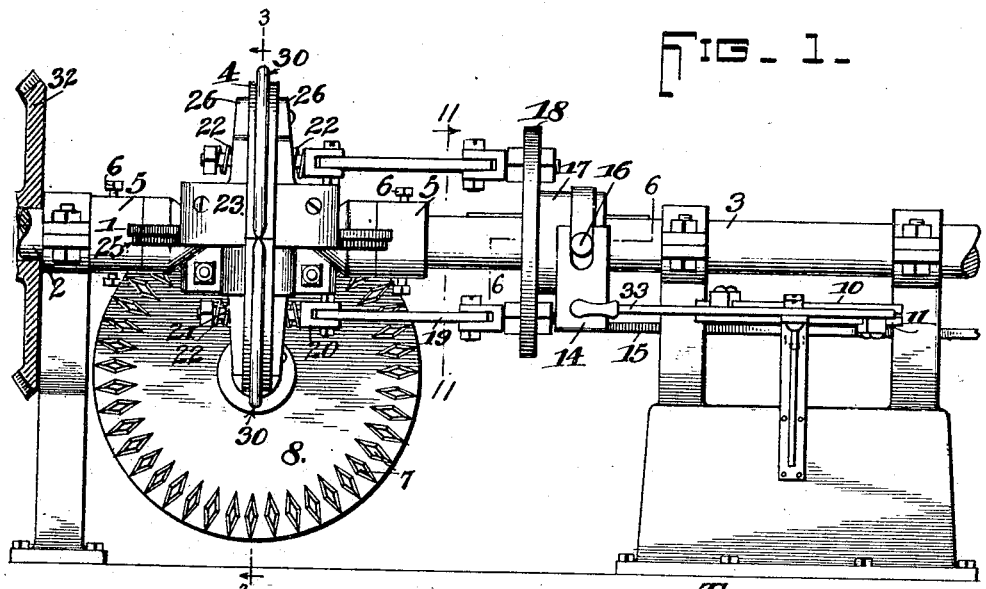
Fig. 1.
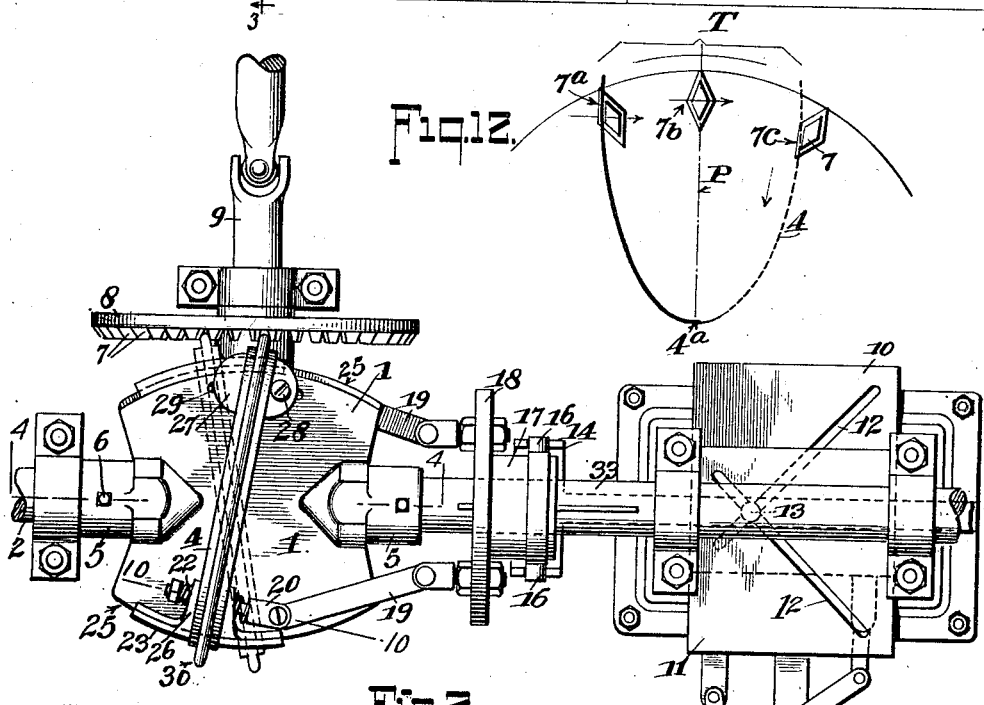
Fig. 12.
Fig. 2.
WITNESSES
John H. Phillips
J. S. Schrott
INVENTOR
AARON FRETZ,
BY
Munn & Co.
ATTORNEYS

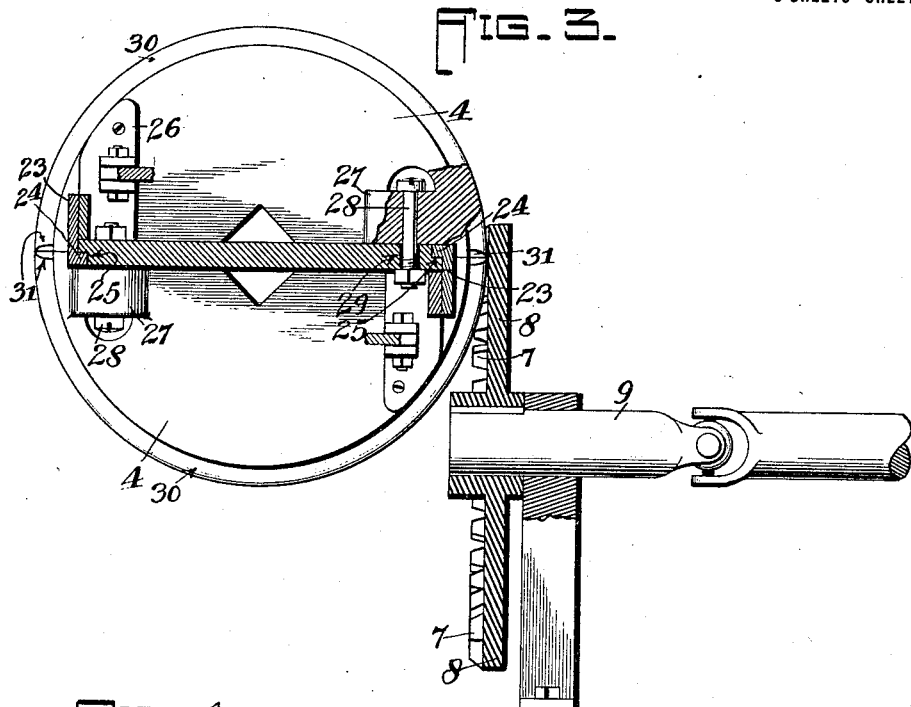
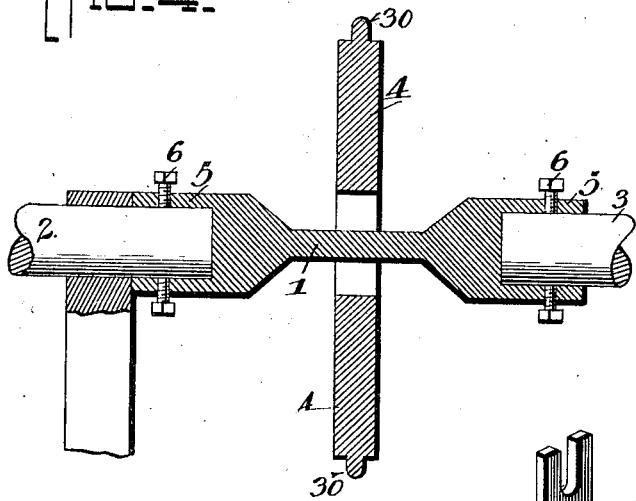
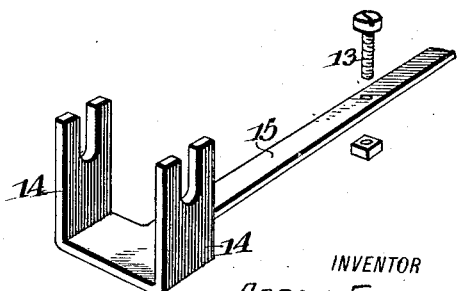

A. FRETZ.
SPEED CHANGE GEARING.
APPLICATION FILED JAN. 9, 1918.
1,286,987.
Patented Dec. 10, 1918.
3 SHEETS—SHEET 3.
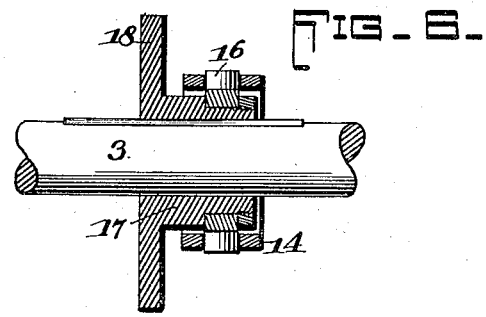
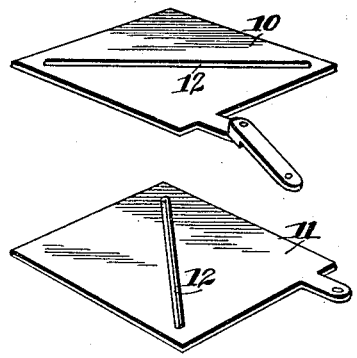
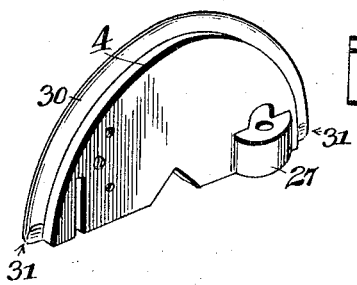
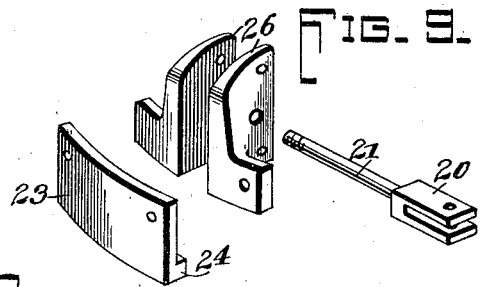
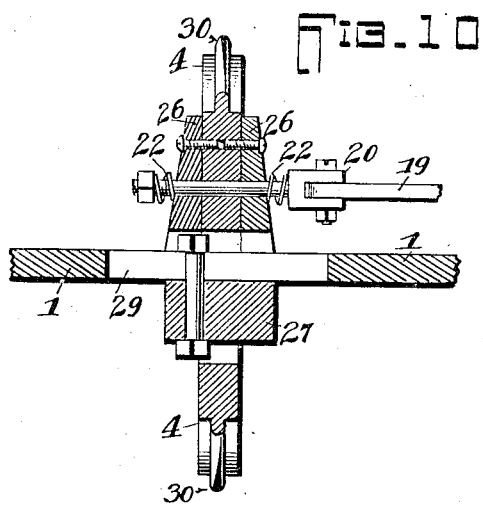
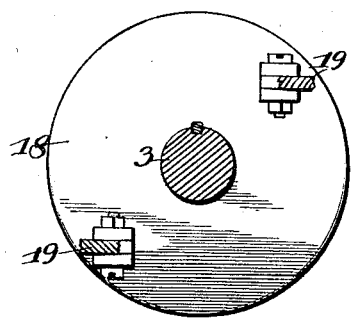
WITNESSES
INVENTOR
AARON FRETZ,
BY
ATTORNEYS

UNITED STATES PATENT OFFICE.

AARON FRETZ, OF EDMOND, OKLAHOMA.

SPEED-CHANGE GEARING.

1,286,987.  Specification of Letters Patent.  Patented Dec. 10, 1918.

Application filed January 9, 1918. Serial No. 211,096.

*To all whom it may concern:*

Be it known that I, AARON FRETZ, a citizen of the United States, and a resident of Edmond, in the county of Oklahoma and State of Oklahoma, have invented a new and useful Improvement in Speed-Change Gearing, of which the following is a specification.

My invention relates to improvements in power transmission mechanism, being more particularly an improvement in gearing whereby the various speeds are obtained, and it consists of the constructions, combinations and arrangements herein described and claimed.

An object of my invention is to provide a speed gearing, including a segment carrier forming a part of the drive shaft, on which a pair of worm segments are mounted for oscillation, and arranged to coöperate with diamond-shaped teeth on the driven disk of the driven shaft.

Another object of the invention is to provide a speed change gearing including the driven disk, having teeth formed in the shape of a diamond for the purpose of obtaining a rolling motion thereupon, when the driving ends of each of the worm segments moves there against, the driving force being thus always applied at right angles to a perpendicular through the torque zone.

Another object of the invention resides in the means for shifting the worm segments on the segment carrier, said means including a pair of sliding cam plates having oppositely inclined slots arranged to impart a rectilinear thrust to the shifting mechanism upon movement of the cam plates in opposite directions.

Other objects and advantages will appear in the following specifications, reference being had to the accompanying drawings in which:

Figure 1 is a side elevation of the speed change gearing, showing the worm segments adjusted to the neutral position.

Fig. 2 is a plan view of the device shown in Fig. 1, the worm segments being shifted to the driving position.

Fig. 3 is a cross section on the line 3—3 of Fig. 1.

Fig. 4 is a longitudinal section of the line 4—4 of Fig. 2.

Fig. 5 is a detail perspective view of the shifting yoke and arm.

Fig. 6 is a detail section of the line 6—6 of Fig. 1.

Fig. 7 is a detail perspective view of the sliding cam plate.

Fig. 8 is a perspective view of one of the worm segments.

Fig. 9 is a perspective view of the binding plate and plate mounts of one of the worm segments.

Fig. 10 is a cross section on the line 10—10 of Fig. 2.

Fig. 11 is a cross section on the line 11—11 of Fig. 1, and

Fig. 12 is a diagrammatic view hereinafter referred to.

In carrying out my invention I provide a segment carrying plate 1 mounted between the members 2 and 3 which constitute the drive shaft of the speed change gearing. A pair of semi-circular worm segments 4 are mounted upon the segment carrier 1, which consists of a substantially flat plate having a shaft socket 5 at each end, in which the ends of the drive shaft members 2 and 3 are projected and secured in place by the set screws 6.

The worm segments 4 engage the diamond-shaped teeth 7 on the driven disk 8 of the driven shaft 9, and are adapted to drive the driven disk when the worm segments are shifted out of alinement with respect to each other as illustrated in Fig. 2. Sliding cam plates 10 and 11 are arranged to shift the worm segments on the segment carrier 1.

The sliding cam plates 10 and 11 have slots 12 at right angles to each other. The slots 12 overlap and a shifting pin 13 of a shifting yoke 14, passes through the opening in the cam plates at the intersection of the slots. The shifting pin 13 is in the nature of a bolt which passes through the shifting arm 15 of the yoke. The shifting yoke 14 receives the trunnions 16 on the hub 17 of a shifting hub 18.

Links 19 join the hub 18 and the worm segments 4 together. Each link 19 is pivotally mounted at one end to the shifting hub, and is pivoted in a head 20 of a connecting shank 21, at the other end. The connecting shank passes through the worm segment 4, and has springs 22 on the opposite end, which compensate for the arcuate thrust of the links 19 in the act of adjusting the worm segments.

Each worm segment 4 has a binding plate 23 at one side, which includes a rib 24 engaging the rabbeted edge 25 of the segment carrier 1. It will be observed in Fig. 3 that the rabbets on the opposing sides of the segment carrier, are formed on the opposite upper and lower surfaces thereof. This formation is incidental to the arrangement of the binding plates 23, which, it will be observed, are secured through plate mounts 26 on diagonally opposite portions of the worm segments.

A boss 27 is formed on each of the worm segments, and is disposed directly over the plate mount 26 of the companion worm segment. A bolt 28 passes through an opening in the mount 27, and enters a slot 29 in the segment carrier. The binding plate 23, and the bolt and slot connections 28 and 29 of each worm segment 4 provides the proper uniform guidance of each worm segment, so that when the worm segments are shifted by means of the cam plates 10 and 11, the worm segments will shift smoothly and without binding.

Each worm segment 4 has a driving edge 30, which is preferably case-hardened in order to withstand the wear. The driving edge 30, it will be observed, is in the shape of a semi-annular rib, rounded on the outer edges so that it will smoothly roll upon the surfaces of the diamond-shaped teeth 7. Each driving edge 30 is beveled at 31 at the opposite ends, the purpose of the beveled ends being to more readily engage the teeth 7, and therefore assist in the presentation of the driving edge to the space between the teeth.

The formation of the teeth 7 is an important factor. Attention is directed to Fig. 12. Here it will be observed that each tooth is of a substantially diamond shape, the vertical wall of each tooth being inclined inwardly. The semi-ellipse 4$^a$ represents one of the worm segments and is intended to illustrate how it acts upon all of the surfaces of one tooth on one side in driving the driven disk in one direction.

It will be seen that at the beginning of a cycle of movement, one end of the worm segment 4 is presented to the upper surface 7$^a$ of a tooth. As the worm segment continues to rotate toward the observer, and the tooth is moved across the plane of rotation, the rounded driving edge 30 will presently come in contact with the ridge 7$^b$ of the tooth. The continued rotation of the worm segment drives the tooth forward, the driving edge 30 then rolling upon the lower surface 7$^c$ of the tooth. It will thus be observed, that there is a continuous rolling action, as it were, of the driving edge 30 of the worm segment, on all of the surfaces of one of the teeth at one side, from the time that the worm segment engages one of the teeth, to the time that the same tooth is forced out of the zone of movement of the worm segment.

This rolling action just described, causes the driving force of the drive shaft to be always applied at right angles to a perpendicular drawn through the torque zone of the driven disk 8. This will more readily be understood by referring to the arrows in Fig. 12. These arrows, it will be observed, are positioned at right angles to the perpendicular P in the center of the torque zone.

From the foregoing description the following operation will be readily understood. The drive shaft consisting of the numbers 2 and 3 is driven by the drive gear 32 which meshes with some other gear driven by an engine. When the worm segment 4 is in the neutral position illustrated in Fig. 1, the rotation of the drive shaft will have no effect on the driven disk 8 because the driving edges 30 will simply move in one of the spaces between a pair of the teeth 7.

Now by grasping the handle 33 of the sliding cam plates 10 and 11, and moving the handle in the direction indicated by the arrow in Fig. 2, the cam plates are moved apart in opposite directions so that the oppositely disposed slots 12 carry the shifting pin 13 forwardly, and shift the worm segments 4 out of alinement through the medium of the inter-connected shifting collar 18 and links 19. The segments 4 virtually constitute a worm drive, and it will be understood that as the drive shaft rotates, the eccentric relationship of the worm segments to the driven disk 8, will cause a rapidity of rotational movement of the driven disk, in proportion to the degree of deviation of the worm segments from alinement with the axis of the driven shaft 9. In this connection it will be understood, that the higher the diamond shaped teeth are, and the longer that the driving edge 30 of each of the worm segments 4 is, the greater will be the zone of torque which the worm segments will embrace.

There are many features of advantage which recommend the form of speed mechanism illustrated in the drawing. It has been pointed out that the rolling motion of the driving edge 30 on each of the worm segments is of such a nature that all of the surfaces of a tooth at one side receive the driving thrust in one of the impulses of one of the segments, and thus the teeth are worn uniformly. The beveled edges 31 of the driving edges, permit the presentation of each driving edge to the teeth 7 in a silent manner, so that in changing the speed of the driven shaft 9 no sound will issue because there is not the usual grinding accompanied by the changing of the gears in the transmission mechanism now in common use.

While the construction and arrangement of the device, illustrated in the accompanying drawings, is that of a generally preferred form, obviously modifications and changes can be made without departing from the spirit of the invention or the scope of the claims.

I claim:

1. In a speed change gearing, a drive shaft having a segment carrier, worm segments shiftable upon the segment carrier, means carried by each worm segment, engaging the segment carrier to guide the worm segments, a driven disk, and diamond-shaped teeth on the driven disk, arranged to receive the thrust of the worm segments on all surfaces on one side when the driving shaft is rotating in one direction.

2. In a speed change gearing, a drive shaft having a segment carrier, worm segments mounted upon the segment carrier, means carried by each worm segment and having slidable engagement with the segment carrier, shifting means in connection with each of the worm segments, oppositely movable cam plates each having a slot, the slots intersecting to provide an opening through said plates, and a shifting arm having a pin connection with said plate in said opening and connecting with said shifting means.

3. In a speed change gearing, a drive shaft, a segment carrier carried by the drive shaft, the carrier having a slot and a rabbeted edge, a worm segment mounted on the carrier, having a binding plate including a rib engaging the rabbeted edge, a boss disposed over the slot with a bolt in the boss projecting into the slot, and shifting means mounted on the drive shaft including a link and a connecting shank.

4. In a speed change gearing, a drive shaft, a segment carrier carried by the drive shaft, the carrier having a slot and a rabbeted edge, a worm segment mounted on the carrier, having a binding plate including a rib engaging rabbeted edge, a boss disposed over the slot with a bolt in the boss projecting into the slot, shifting means mounted on the drive shaft including a link and a connecting shank, and springs mounted on said shaft in engagement with opposite side portions of the worm segment.

5. In a speed change gearing, a drive shaft having a segment carrier, a segment shiftable on the carrier and including means engaging portions of the carrier for guiding the segment in movement, a hardened driving edge, comprising a rounded bead formed on the segment, the ends of the driving edge being beveled, a driven disk, and diamond-shaped teeth on the disk, the driving edge being adapted to first engage one of the surfaces of one of the teeth on one side and roll into engagement with the other surface of the tooth on the same side in driving the driven disk forward, thereby uniformly applying pressure to all of the surfaces in succession and imparting a thrust at right angles to a perpendicular through the zone of torque.

6. In a speed change gearing, a drive shaft, including shaft members, a segment carrier having sockets receiving the ends of said members, said carrier consisting of a plate having a rabbeted edge on one side and a slot on the other, a worm segment shiftable and mounted on the segment carrier, a binding plate including a rib engaging the rabbeted edge of the segment carrier, a plate mounting secured to the worm segment and to the binding plate, a boss on the worm segment having a bolt projecting into the slot on the other side, a connecting shank passing through the worm segment and portions of the plate mounting, buffer springs on the shank engaging the plate mounting, shifting collar including a hub slidable on the drive shaft, links between said shank and said collar, oppositely movable cam plates having slots extending in opposite directions leaving an opening through the cam plates at the point of intersection of the slots, a handle with link devices connected to the plate for moving them in opposite directions, a shifting arm, including a yoke engaging the hub and a shifting pin occupying the opening at the intersection of said slots.

AARON FRETZ.

Copies of this patent may be obtained for five cents each, by addressing the "Commissioner of Patents, Washington, D. C."